US009554091B1

(12) United States Patent
Malegaonkar et al.

(10) Patent No.: US 9,554,091 B1
(45) Date of Patent: Jan. 24, 2017

(54) IDENTIFYING CONFERENCE PARTICIPANTS AND ACTIVE TALKERS AT A VIDEO CONFERENCE ENDPOINT USING USER DEVICES

(71) Applicant: Cisco Technology, Inc., San Jose, CA (US)

(72) Inventors: Ashutosh Malegaonkar, Milpitas, CA (US); Keith Griffin, Galway (IE)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/969,835

(22) Filed: Dec. 15, 2015

(51) Int. Cl.
| | |
|---|---|
| H04N 7/14 | (2006.01) |
| H04N 7/15 | (2006.01) |
| G10L 17/00 | (2013.01) |
| H04R 3/00 | (2006.01) |
| H04R 1/40 | (2006.01) |

(52) U.S. Cl.
CPC ............. *H04N 7/152* (2013.01); *G10L 17/005* (2013.01); *H04N 7/147* (2013.01); *H04R 1/403* (2013.01); *H04R 3/005* (2013.01); *H04R 2201/401* (2013.01)

(58) Field of Classification Search
CPC ...................................................... H04N 7/14
USPC .... 348/14.01, 14.04; 379/93.21, 158, 202.01
See application file for complete search history.

(56) References Cited

U.S. PATENT DOCUMENTS

| | | | |
|---|---|---|---|
| 5,896,565 A | 4/1999 | Miller | |
| 6,374,145 B1 | 4/2002 | Lignoul | |
| 7,881,233 B2 | 2/2011 | Bieselin | |
| 8,212,854 B2 | 7/2012 | Marton et al. | |
| 8,315,366 B2 * | 11/2012 | Basart | H04M 15/06 379/142.01 |
| 8,675,067 B2 | 3/2014 | Chou et al. | |
| 8,738,763 B2 | 5/2014 | Crystal et al. | |
| 8,811,119 B2 | 8/2014 | Aarts et al. | |
| 2005/0213739 A1 | 9/2005 | Rodman et al. | |
| 2008/0218582 A1 * | 9/2008 | Buckler | H04N 7/15 348/14.08 |

(Continued)

OTHER PUBLICATIONS

Wang, Avery Li-Chun, "An Industrial-Strength Audio Search Algorithm," Proceedings of the 4th International Conference on Music Information Retrieval, 2003, 7 pages.

(Continued)

*Primary Examiner* — Olisa Anwah
(74) *Attorney, Agent, or Firm* — Edell, Shapiro & Finnan, LLC

(57) ABSTRACT

A video conference endpoint includes a microphone array to detect ultrasound transmitted by a user device and that is encoded with a user identity. The endpoint determines a position of the user device relative to the microphone array based on the detected ultrasound and recovers the user identity from the detected ultrasound. The microphone array also detects audio in an audio frequency range perceptible to humans from an active talker, and determines a position of the active talker relative to the microphone array based on the detected audio. The endpoint determines whether the position of the active talker and the position of the user device are within a predetermined positional range of each other. If it is determined that the positions are both within the predetermined positional range, the endpoint assigns the user identity to the active talker.

20 Claims, 8 Drawing Sheets

(56) References Cited

U.S. PATENT DOCUMENTS

| | | | |
|---|---|---|---|
| 2012/0001875 | A1 | 1/2012 | Li et al. |
| 2012/0327177 | A1* | 12/2012 | Kee .................. H04N 7/15 348/14.08 |
| 2013/0106975 | A1 | 5/2013 | Chu et al. |
| 2013/0106976 | A1 | 5/2013 | Chu et al. |
| 2013/0106977 | A1 | 5/2013 | Chu et al. |
| 2013/0106982 | A1 | 5/2013 | Anantharaman et al. |
| 2013/0129102 | A1 | 5/2013 | Li et al. |
| 2014/0118472 | A1 | 5/2014 | Liu et al. |
| 2014/0164629 | A1 | 6/2014 | Barth et al. |
| 2015/0341719 | A1* | 11/2015 | Sun .................. H04R 1/32 381/92 |
| 2016/0057385 | A1* | 2/2016 | Burenius .......... H04N 7/15 348/14.16 |
| 2016/0134838 | A1* | 5/2016 | Tangeland ........ H04N 7/152 348/14.09 |

OTHER PUBLICATIONS

Friedland et al., "Live Speaker Identification in Conversations," MM '08 Proceedings of the 16th ACM International Conference on Multimedia, Oct. 2008, pp. 1017-1018.

"International Symposium on Music Information Retrieval," ISMIR 2003 Program, Oct. 26-30, 2003, 2 pages.

Tarzia, "Acoustic Sensing of Location and User Presence on Mobile Computer", Technical Report NWU-EECS-11-09, Northwestern University—Electrical Engineering and Computer Science Department, Aug. 31, 2011, 113 pages.

Ricci et al., "Experimental validation of an ultrasound-based measurement system for human motion detection and analysis", Instrumentation and Measurement Technology Conference (I2MTC), 2013 IEEE International, vol., No., pp. 300,305, May 6-9, 2013.

Bloom et al, "Digital Ultrasonic Motion Detector", Teaching Projects in SIPL, http://sipl.technion.ac.il/Info/Teaching_Projects_5-2-09_e.shtml, Sep. 2011, 5 pages.

"IT Glossary—Automatic Content Recognition (ACR)", Gartner, http://www.gartner.com/it-glossary/, Retrieved Dec. 16, 2014, 2 pages.

Bruce Davis, Signal Rich Art: Enabling the vision of Ubiquitous Computing, SPIE Proceedings vol. 7880: Media Watermarking, Security, and Forensics III, Feb. 8, 2011, 11 pages.

Lopes et al. "Aerial Acoustic Communications", IEEE, Applications of Signal Processing to Audio and Acoustics, 2001 IEEE Workshop on the, Oct. 2001, 4 pages.

Modegi, "Detection Method of Mobile Terminal Spatial Location Using Audio Watermark Technique", ICROS-SICE International Joint Conference 2009, Fukuoka International Congress Center, Japan, Aug. 2009, 6 pages.

\* cited by examiner

IDENTIFYING CONFERENCE PARTICIPANTS AND ACTIVE TALKERS AT A VIDEO CONFERENCE ENDPOINT USING USER DEVICES

TECHNICAL FIELD

The present disclosure relates to identifying participants and active talkers in a video conference system.

BACKGROUND

A video conference system includes an endpoint device that captures audio-visual information from participants in a room during a conference, for example, and then transmits the audio-visual information over a network for presentation of the audio-visual information at remote endpoint devices, at other locations, joined in the conference. Identifying all of the participants at all of the locations that are joined in the conference, and which of the participants is/are actively talking at any given time, can help achieve a satisfying user experience, but presents a technical challenge.

DESCRIPTION OF EXAMPLE EMBODIMENTS

Overview

A video conference endpoint device (i.e., "endpoint") includes a microphone array to detect ultrasound transmitted by a user device and that is encoded with a user identity. The endpoint determines a position of the user device relative to the microphone array based on the detected ultrasound and recovers the user identity from the detected ultrasound. The microphone array also detects audio in an audio frequency range perceptible to humans from an active talker, and determines a position of the active talker relative to the microphone array based on the detected audio. The endpoint determines whether the position of the active talker and the position of the user device are within a predetermined positional range of each other. If it is determined that the positions are both within the predetermined positional range, the endpoint assigns the user identity to the active talker.

Example Embodiments

Figure 1:
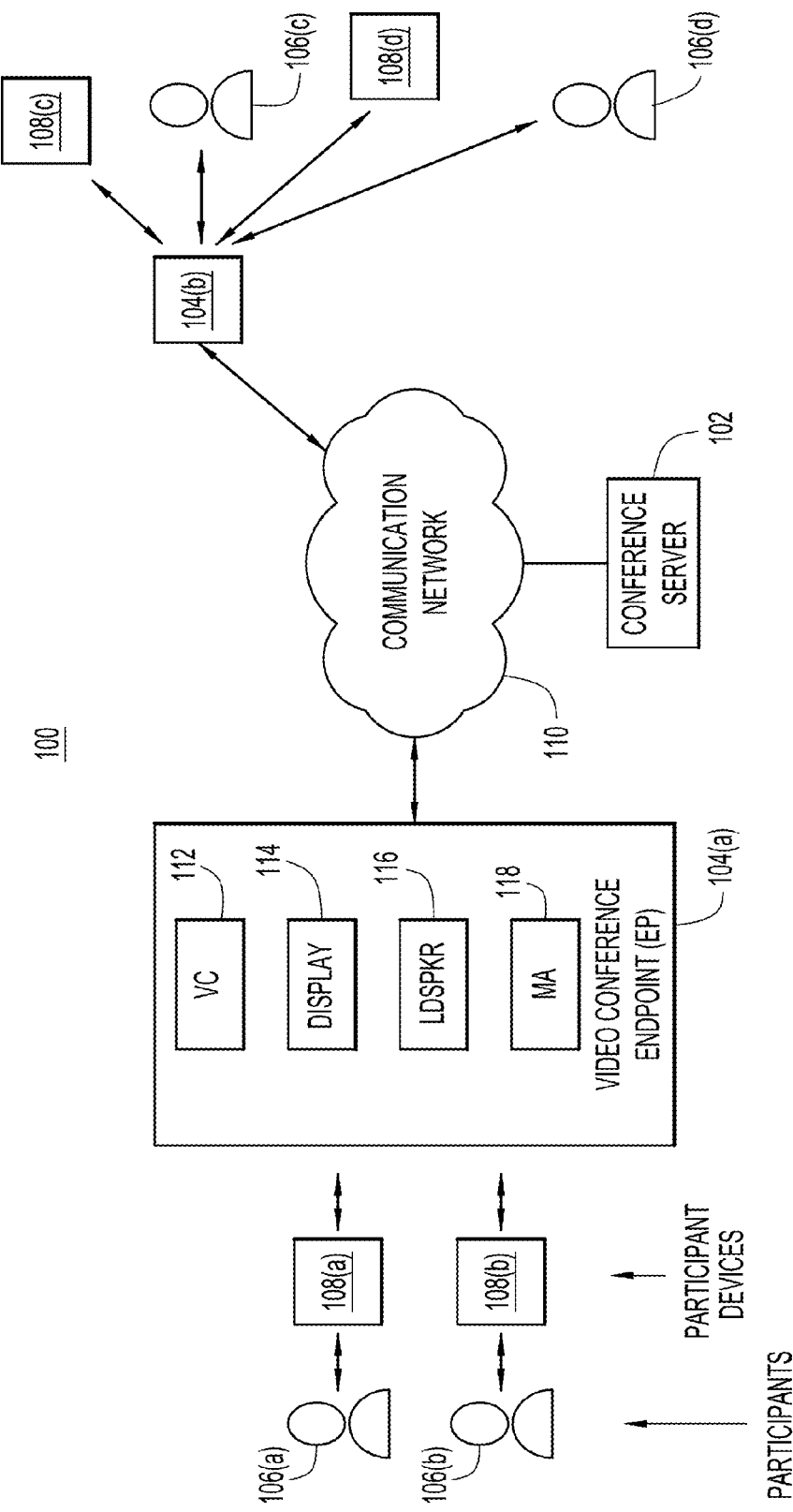
FIG. 1 is a block diagram of a video conference (e.g., teleconference or telepresence) system in which embodiments directed to identifying participants and active talkers among the participants in a video conference session (also referred to as simply a "conference" session) may be implemented, according to an example embodiment.

With reference to FIG. 1, there is depicted a block diagram of a video conference (e.g., teleconference) system 100 in which embodiments directed to identifying participants and active talkers among the participants in a video conference session or online-meeting may be implemented. Video conference system 100 includes video conference or collaboration endpoint (EP) devices 104 (referred to simply as "endpoints") operated by local users/participants 106 and configured to establish audio-visual teleconference collaboration sessions with each other over a communication network 110. Multiple endpoints and a single endpoint may be referred to herein as "endpoints 104" and "endpoint 104," respectively. Participants 106 may each be equipped with a respective one of user devices 108 (also referred to as "participant" devices 108) that enable the participants to interact with a corresponding one of endpoints 106 proximate the user device over wired or wireless communication links with the endpoint. The term "proximate" means co-located at the same geographical location and within wireless audio (including ultrasound) communication range. User devices 108 may be wired or wireless communication devices capable of receiving, processing, storing, and/or communicating information with endpoints 106, and may include, but are not limited to laptop and tablet computers, smartphones, and the like. Communication network 110 may include one or more wide area networks (WANs), such as the Internet, and one or more local area networks (LANs). A conference server 102 may also be deployed to establish and manage collaboration sessions between conference endpoints 104 and coordinate the routing of audio-video streams among the video conference endpoints involved in such collaboration sessions. System 100 may include any number of endpoints 104, participants 106, and user devices 108 in a variety of different geographical locations.

Each video conference endpoint 104 may include one or more video cameras (VC) 112, a video display 114, a loudspeaker (LDSPKR) 116, and a microphone array (MA) 118. Endpoints 104 may be wired or wireless communication devices equipped with the aforementioned components, such as, but not limited to laptop and tablet computers, smartphones, etc. In a transmit direction, endpoints 104 capture audio/video from their local participants 106 with MA 118/VC 112, encode the captured audio/video into data packets, and transmit the data packets to other endpoints or to the conference server 102. In a receive direction, endpoints 104 decode audio/video from data packets received from the conference server 102 or other endpoints and present the audio/video to their local participants 106 via loudspeaker 116/display 114. According to embodiments presented herein, conference endpoints 104 are ultrasound-capable endpoints configured to receive/detect and optionally transmit ultrasonic signals (i.e., ultrasound) as well as receive/detect and transmit audio in a frequency range that is perceptible to human hearing, as described below. Similarly, user devices 106 are ultrasound-capable user devices configured to transmit and optionally receive ultrasound. A pair of co-located ultrasound-capable devices, such as an ultrasound-capable endpoint and an ultrasound-capable user device, are capable of communicating with each other over a wireless ultrasound link, as described below.

Figure 2:
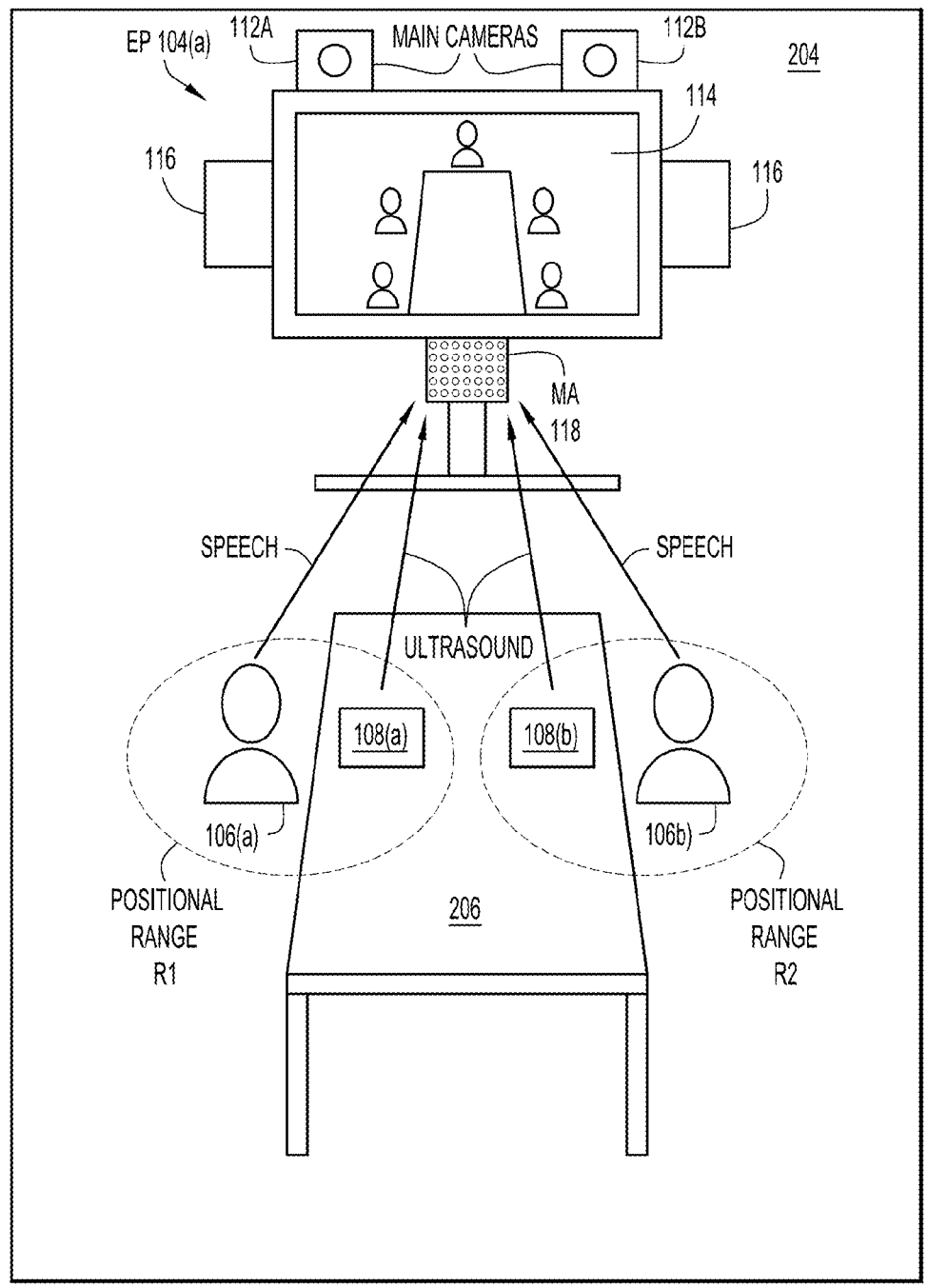
FIG. 2 is an illustration of video conference endpoint device (also referred to as simply an "endpoint") deployed in a conference room, according to an example embodiment.

Referring now to FIG. 2, there is depicted an illustration of ultrasound-capable video conference endpoint 104(*a*) deployed in a conference room 204 (depicted simplistically as an outline in FIG. 2) alongside participants 106(*a*) and 106(*b*) equipped with respective ultrasound-capable user devices 108(*a*) and 108(*b*), according to an embodiment. Video conference endpoint 104(*a*) includes main or center video cameras 112A and 112B positioned proximate and centered on display 114. Cameras 112A and 112B (collectively referred to as "cameras 112") capture video of participants 106(*a*) and 106(*b*) seated around a table 206 opposite from or facing (i.e., in front of) the cameras (and display 114). User devices 106(*a*) and 106(*b*) are supported by table 206 and positioned near to respective participants 108(*a*) and 108(*b*).

As depicted in the example of FIG. 2, MA 118 is positioned adjacent to, and centered along, a bottom side of display 114 (i.e., below the display) so as to receive audio from participants 106(*a*) and 106(*b*) in room 204. In an example, MA 118 includes an array of dual-band microphones configured to (i) detect audio in a first audio frequency range perceptible to human hearing (i.e., human-perceptible audio, such as, but not limited to, speech or voice originated by participants 106) and (ii) detect ultrasound in a second audio frequency range that is generally beyond the frequency range of human hearing (i.e., human-imperceptible audio) originated by ultrasound-capable user devices 108(*a*) and 108(*b*). The frequency range of ultrasound is generally accepted as being approximately 19 KHz or 20 KHz and above, which most people would not be able to hear. Loudspeakers 116 may also be configured as dual-band loudspeakers able to generate both human-perceptible audio for consumption by participants 106(*a*) and 106(*b*) and ultrasound for receipt by user devices 108(*a*) and 108(*b*).

According to embodiments described herein, endpoint 104(*a*) establishes a video conference session with other endpoints. Endpoint 104(*a*) identifies participants joined in the conference session based on encoded ultrasound transmitted by user devices 108 associated with the participants. In addition, endpoint 104(*a*) identifies active talkers among the identified participants based on human-perceptible audio from the active talkers and the encoded ultrasound from the user devices.

Figure 3:
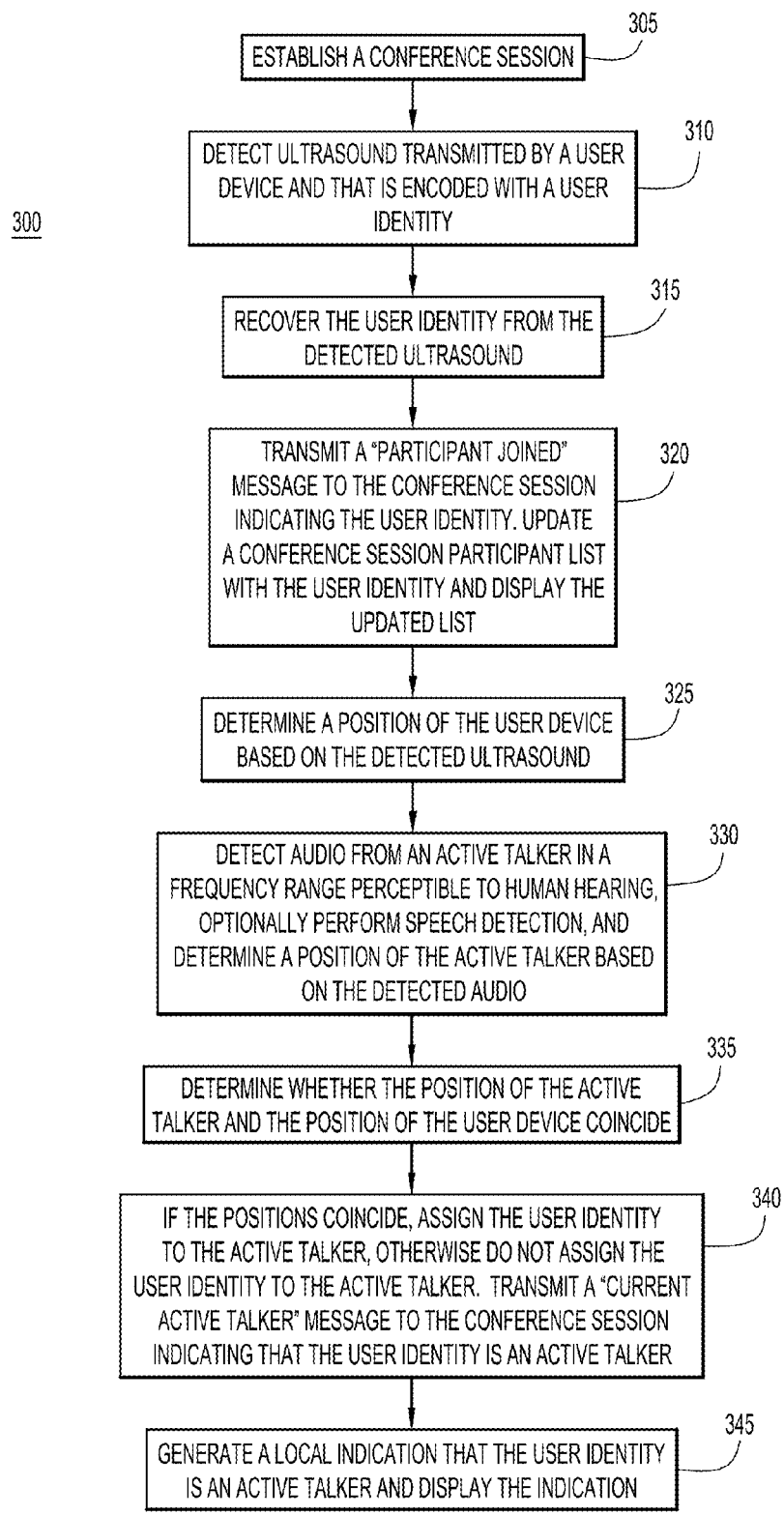
FIG. 3 is a flowchart of a method of identifying (i.e., tagging) participants in a conference session and active talkers among the participants based on detecting ultrasound from user devices associated with the participants and human-perceptible audio from the participants, according to an example embodiment.

With reference to FIG. 3, there is flowchart of an example method 300 of identifying (i.e., tagging) participants in a conference session and active talkers among the participants based on detecting ultrasound from user devices associated with the participants and detecting human-perceptible audio from the participants. The operations of method 300 are performed primarily in/by an endpoint, e.g., endpoint 104(*a*). Method 300 is described with continued reference to FIGS. 1 and 2.

Method 300 assumes that, initially, user device 108(*a*) stores personal (user) information about participant 106(*a*) that uniquely identifies the participant. The personal user information associates user device 108(*a*) with participant 106(*a*). Such personal user information may include a user name/identity (e.g., "Person A"), which may be a first name and/or a last name, an email address, or other suitable personalized information for participant 106(*a*). In an example, participant 106(*a*) may enter the personal information into user device 108(*a*) before method 300 begins or during method 300. User device 108(*a*) also stores a unique user device identifier (ID) for the user device. Similarly, user device 108(*b*) stores personal information about participant 106(*b*). User device 108(*b*) also stores a unique user device identifier (ID) for the user device. By way of example, the ensuing description assumes that the personal information for participant 106(*a*) stored in user device 108(*a*) includes at least a user identity "Person A" for participant 106(*a*) and the personal information for participant 106(*b*) stored in user device 108(*b*) includes at least a user identity "Person B" for participant 106(*b*). "User identity" and "username" may be used synonymously and interchangeably herein.

At 305, endpoint 104(*a*) communicates with conference server 102 to establish a conference session with other endpoints, e.g., endpoint 104(*b*). Endpoint 104(*a*) provides its geographical or other designated location (e.g., "Conference Room A, Main Campus Office, San Jose," etc.) to conference server 102. Endpoint 104(*a*) opens a user interface to present to participants 108(*a*) and 108(*b*) content from the other endpoints during the conference session, display a roster or list of participants (the "participant list") identified by their user identities that are currently joined in the conference, and display the locations of endpoint 104(*a*) and the other endpoints through which the participants are interacting with the conference session (also referred to as participant locations). Endpoint 104(*a*) may receive information used to construct the participant list from other endpoints directly or via conference server 102. Alternatively, endpoint 104(*a*) may populate its own participant list locally without interaction with other endpoints or conference server 102. Initially, the participant list does not include identities for participants 108(*a*) and 108(*b*).

At 310, user device 108(*a*) transmits ultrasound encoded with the personal user information (e.g., user identity Person A) for participant 106(*a*) that uniquely identifies the participant, and optionally encoded with the device ID of user device 108(*a*). MA 118 of endpoint 104(*a*) detects the encoded ultrasound transmitted by user device 108(*a*). Similarly, user device 108(*b*) transmits ultrasound encoded with the personal user information (e.g., user identity Person B) for participant 106(*b*) and optionally the user ID of user device 108(*b*), and MA 118 detects the encoded ultrasound transmitted by user device 108(*b*). The user devices may amplitude, frequency, or phase modulate their respective transmitted ultrasound with information to be conveyed by the ultrasound, and the endpoints may demodulate the modulated ultrasound to recover the information encoded (modulated) thereon using any known or hereafter developed technique.

At 315, endpoint 104(*a*) decodes/recovers the user identity (e.g., Person A) for participant 106(*a*), and optionally the device ID for user device 108(*a*), from the detected ultrasound corresponding to (i.e., transmitted by) user device 108(*a*). Endpoint 104(*a*) associates the recovered user identity (e.g., Person A) with user device 108(*a*) because the user identity was recovered from the ultrasound transmitted by that user device. To do this, endpoint 104(*a*) may store a mapping of the recovered user identity to the recovered device ID. Similarly, endpoint 104(a) decodes/recovers the user identity (e.g., Person B) for participant 106(b), and optionally the device ID of user device 108(b), from the detected ultrasound corresponding to user device 108(b). Endpoint 104(a) associates the recovered user identity (e.g., Person B) with user device 108(b).

In addition, endpoint 104(a) may use the user identity/unique identifier(s) recovered from the ultrasound to retrieve further user information about the participant(s) from one or more other directories that store sources of expanded information (i.e., rich information) about the participant(s), such as a corporate directory that stores such information. The directories may be integrated with and accessible to the various components of system 100, for example. Methods described herein may use the rich information from the directories to help identify/confirm the identities of active talkers and/or increase an accuracy with which active talkers are identified. Endpoint 104(a) may access/retrieve the rich information about the participants from local and remote databases that store the rich information, e.g., using the recovered user identities as an index into the databases. Such databases may be stored locally in endpoint 104(a) and/or remotely in conference server 102, or other database servers, accessible over network 110.

At 320, for each recovered user identity (e.g., Person A and Person B), endpoint 104(a) transmits a "participant joined" message to the other endpoints involved with the conference session that indicates that a participant identified by the user identity (e.g., Person A or Person B) has joined the conference session at the location associated with endpoint 104(a). Endpoint 104(a) may transmit the "participant joined" messages to the other endpoints via conference server 102. Also, endpoint 104(a) updates the participant list (by adding each of the recovered user identities (e.g., Person A and Person B)) to the participant list. Endpoint 104(a) may perform the update of the participant list without interaction with conference server 102. Alternatively, endpoint 104(a) may receive the updated participant list from conference server 102 (which generated the updated participant list based on the "participant joined" messages transmitted from endpoint 104(a), and then transmitted the updated participant list to all endpoints involved with the conference session, including endpoint 104(a)). Endpoint 104(a) displays the updated participant list to identify Person A and Person B as joined participants. An example screen shot of a participant list for a conference session is described below in connection with FIG. 6.

At 325, endpoint 104(a) determines a position of user device 108(a) relative to MA 118 based on the detected ultrasound corresponding to (i.e., transmitted by) user device 108(a). The position may be an angular position relative to the MA, a linear distance of the user device from the MA, or both. Similarly, endpoint 104(a) determines a position of user device 108(b) relative to MA 118 based on the detected ultrasound corresponding to user device 108(b).

At 330, MA 118 also detects audio that is in the frequency range of human hearing (i.e., human perceptible audio) either concurrently or non-concurrently with the ultrasound. The audio may include human speech/voice originating from either participant 106(a) or 106(b) (or both) if/while the participant is actively talking, in which case the detected audio represents audio from an active talker. Endpoint 104(a) determines a position of the active talker (i.e., a position of a source or an origin of the human-perceptible audio) relative to MA 118 based on the detected audio. The position of the active talker may be an angular position relative to MA 118, a distance of the active talker from the microphone array, or both.

The detected audio may also include non-voice/non-speech background noise caused by movement of participants within room 204, such as moving chairs, closing doors, or other background non-speech events. In an embodiment that filters-out or eliminates such non-human speech from consideration, endpoint 104 first determines whether the detected audio at 330 qualifies as speech before the endpoint determines a position of an active talker based on the detected audio. If it is determined that the detected audio qualifies as speech, then endpoint 104(a) determines the position of the active talker based on the detected audio, otherwise, the endpoint does not determine the position. In this way, endpoint 104(a) increases the likelihood that the determined position corresponds to an actual active talker, not background noise. Any known or hereafter developed technique may be used to determine whether the detected audio is voice/speech.

At 335, endpoint 104(a) determines whether the position of the active talker (determined based on the detected audio) coincides with any of the positions of the user devices (determined based on the detected ultrasound), i.e., whether the position of the active talker is within a predetermined positional range of the position of either user device 108(a) or user device 108(b). To do this, in one example, endpoint 104(a) compares the position of the active talker to the position of each user device (e.g., the position of user device 108(a) and the position of user device 108(b)) in search of a match. In an example where the position of the active talker and the position of each user device are angular positions (i.e., angles) relative to MA 118, endpoint 104(a) determines whether both angles (i.e., the angle of the active talker and the angle of the user device being compared to the angle of the active talker) are in a same predetermined angle range relative to MA 118. In an example where both positions are distances relative to MA 118, endpoint 104(a) determines whether both distances are in a same predetermined distance range relative to MA 118. In another example in which both positions include a corresponding distance and a corresponding angle, endpoint 104(a) determines whether both distances fall into the same predetermined distance range relative to MA 118 and both angles fall into the same predetermined angle range relative to MA 118, in which the positions are considered to coincide if both the distances and the angles fall into their respective positional ranges. An example predetermined distance range may be 3 feet, and an example predetermined angle range may be 10 degrees.

At 340, if it is determined that the position of the active talker and one of the user device positions coincide, endpoint device 104(a) assigns to the active talker the user identity associated with the coinciding user device, where the "coinciding user device" is the user device having the position that coincides with the position of the active talker. In other words, endpoint 104(a) infers that the active talker has the user identity associated with the user device that coincides positionally with the active talker. For example, if it is determined that the position of the active talker coincides with the position of user device 108(a) (which is associated with user identity Person A), endpoint 104(a) assigns to the active talker the user identity Person A. Alternatively, if it is determined that the position of the active talker coincides with the position of user device 108(b) (which is associated with user identity Person B), endpoint 104(a) assigns to the active talker the user identity Person B.

With reference again to FIG. 2, endpoint 104(a) may use a positional range R1 associated with the position of user device 108(a) to determine whether an active talker coincides with the position of the user device. For example, if the position of user device 108(a) and the position of an active talker are determined to be within positional range R1, the active talker is assigned the user identity associated with participant 106(a). Similarly, endpoint 104(a) may also use a positional range R2 associated with the position of user device 108(b) to determine whether an active talker coincides with the position of that user device. Techniques for determining positions and their use with positional ranges in described further below in connection with FIGS. 4 and 5.

Responsive to the user identity being assigned to the active talker as described above, endpoint 104(a) transmits to the other endpoints a "current active talker" message indicating that the user identity assigned at 340 (e.g., Person A) at the location of endpoint 104(a) is currently an active talker. Endpoint 104(a) may transmit the "current active talker" message to the other endpoints via conference server 102.

At 345, also responsive to the user identity being assigned to the active talker, endpoint 104(a) updates the participant list to indicate as a current active talker the user identity listed on the participant list that matches the user identity assigned at 340. Endpoint 104(a) may perform this active talker update of the participant list locally without interaction with conference server 102. Alternatively, endpoint 104(a) may receive an active talker indication from conference server 102 (which initially received the "current active talker" message from endpoint 104(a), and then transmitted the active talker indication to all endpoints involved with the conference session, including endpoint 104(a)). Endpoint 104(a) displays the active talker indication.

In another embodiment used to assist with identifying active talkers, user devices 108(a) and 108(b) store respective voice prints from their respective owners (e.g., participants 106(a) and 106(b)), and are enabled to capture voice samples (audio) and compare the captured audio to the stored voice prints. If, at a given one of the user devices, the captured audio matches the stored voice print, that user device transmits ultrasound encoded with (i) an indication that the owner (participant) is an active talker, the user identity, and the device ID, all of which are detected and decoded at endpoint 104(a). Endpoint 104(a) may then transmit the indication of the active talker with the user identity to the other endpoints, and display the indication on the participant list.

In yet another embodiment, the following operations may be performed:
 a. When a participant in a room talks, MA 118 detects the corresponding audio, and the endpoint (e.g., endpoint 104(a)) determines an approximate position of the participant in the room based on the detected audio.
 b. The endpoint transmits from an ultrasound loudspeaker thereof an ultrasound signal to a user device that has already paired with the endpoint (based on ultrasound previously transmitted by the user device to the endpoint). Optionally the ultrasound signal from the endpoint may be directionally targeted by the endpoint to a portion of the room.
 c. The user device transmits a calibrated talker (audio) power level metric back to the endpoint.
 d. The endpoint uses a highest talker (audio) power level metric combined with its relative position in the room to determine the active talker.

Figure 4:
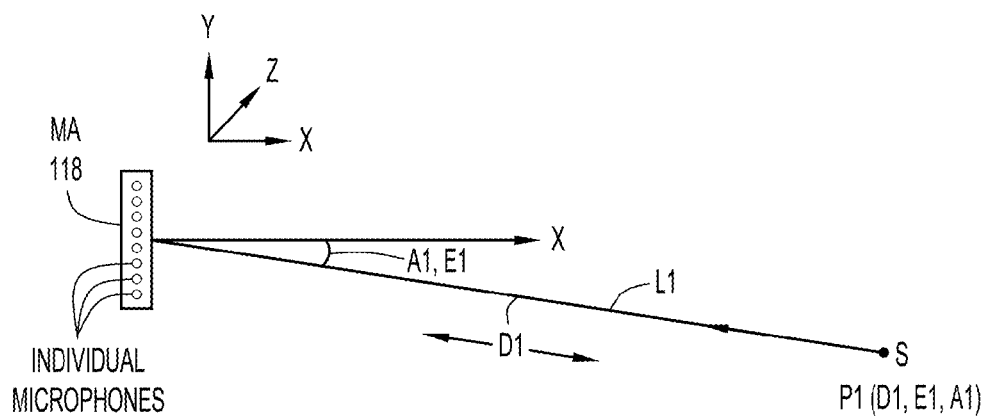
FIG. 4 is a side-view of an example active audio source spaced apart from a microphone of an endpoint, according to an example embodiment.

With reference to FIG. 4, there is depicted a side-view of an example active audio source S spaced apart from MA 118. The audio source may represent speech/voice originating from an active talker among participants 106(a) and 106(b). Alternatively, the audio source may represent one of user devices 108(a) and 108(b) transmitting ultrasound. Audio source S is separated or spaced from MA 118 by a distance D1 along a directional axis line L1. Audio source S subtends an elevation angle E1 relative to an x-z plane (i.e., the plane encompassing both the x axis and the z axis) and an azimuth angle A1 relative to an x-y plane (i.e., the plane encompassing both the x axis and the y axis). Distance D1, elevation angle E1, and azimuth angle A1 collectively define a 3-Dimensional (3-D) position P1 of audio source S relative to MA 118. MA 118 receives audio from audio source S, detects the received audio, and provides the detected audio to a controller of endpoint 104(a) (described below in connection with FIG. 7). The endpoint controller performs audio signal processing on the detected audio, particularly from different spaced-apart pairs of microphones of MA 118, to derive a sound angle of arrival (i.e., simply "angle") at MA 118 of the audio originating from audio source S. In an embodiment in which MA 118 is a planar 2-D MA, the derived sound angle of arrival encompasses elevation angle E1 and azimuth angle A1, and range D1. MA 118 may include a first array of microphones in which each microphone is configured to detect ultrasound and a second array of microphones in which each microphone is configured to detect audio in an audio frequency range perceptible to human hearing. Alternatively, MA 118 may include an array of microphones in which each microphone is configured to be responsive to both ultrasound and human-perceptible audio.

In one example, the sound angle of arrival may be derived based on a time difference $\Delta t$ between time-of-arrivals (TOAs) of sound received at (and detected by) the individual microphones. Additionally, the endpoint controller also derives distance D1 between MA 118 and audio source S based on a combination of multiple time differences $\Delta t$ derived from the sensed audio from the different microphone pairs. Thus, the endpoint controller derives an estimate of the 3-D position P1 of audio source S (e.g., an active talker or a user device) as estimates of the parameters: distance D1; elevation angle E1, and azimuth angle A2. In another example, the angle and range of incoming audio can be calculated by finding the sample delay between microphone pairs. The sample delay for one pair corresponds to a limited number of positions in space. By combining the results from multiple pairs the result will be refined down to a single possible position. In another example, angle of arrival and/or distance may be derived based on relative power levels of the audio received at the individual microphones. In another example, distance may be derived based on predetermined/calibrated power-level vs. distance look-up tables.

Figure 5:
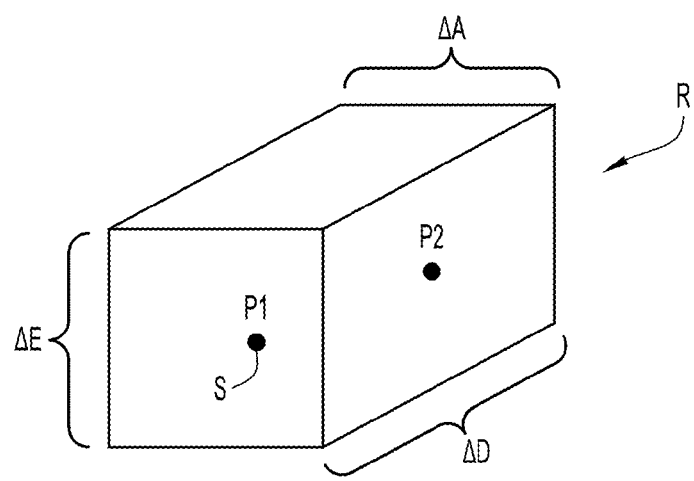
FIG. 5 is an illustration of an example construct used to determine whether an active talker determined to have a first position and a user device determined to have a second position coincide positionally with each other, according to an example embodiment.

With reference to FIG. 5, there is an illustration of an example construct used to determine whether an active talker determined to have a position P1 relative to a microphone array and a user device determined to have a position P2 relative to the microphone array coincide positionally with each other, i.e., whether their respective positions match each other within a predetermined positional range. The active talker at position P1 and the user device at position P2 are determined to coincide positionally with each other if it is determined that position P1 is within a predetermined 3-D positional range R centered on position P2. In the example of FIG. 5, positional range R is depicted as a box centered on P2 and defining an elevation angle range ΔE, an azimuth angle range ΔA, and a distance range ΔD. Positional range R may be simplified to represent a 1-D range or a 2-D range that uses a subset of the elevation angle range ΔE, the azimuth angle range ΔA, and the distance range ΔD.

Figure 6:
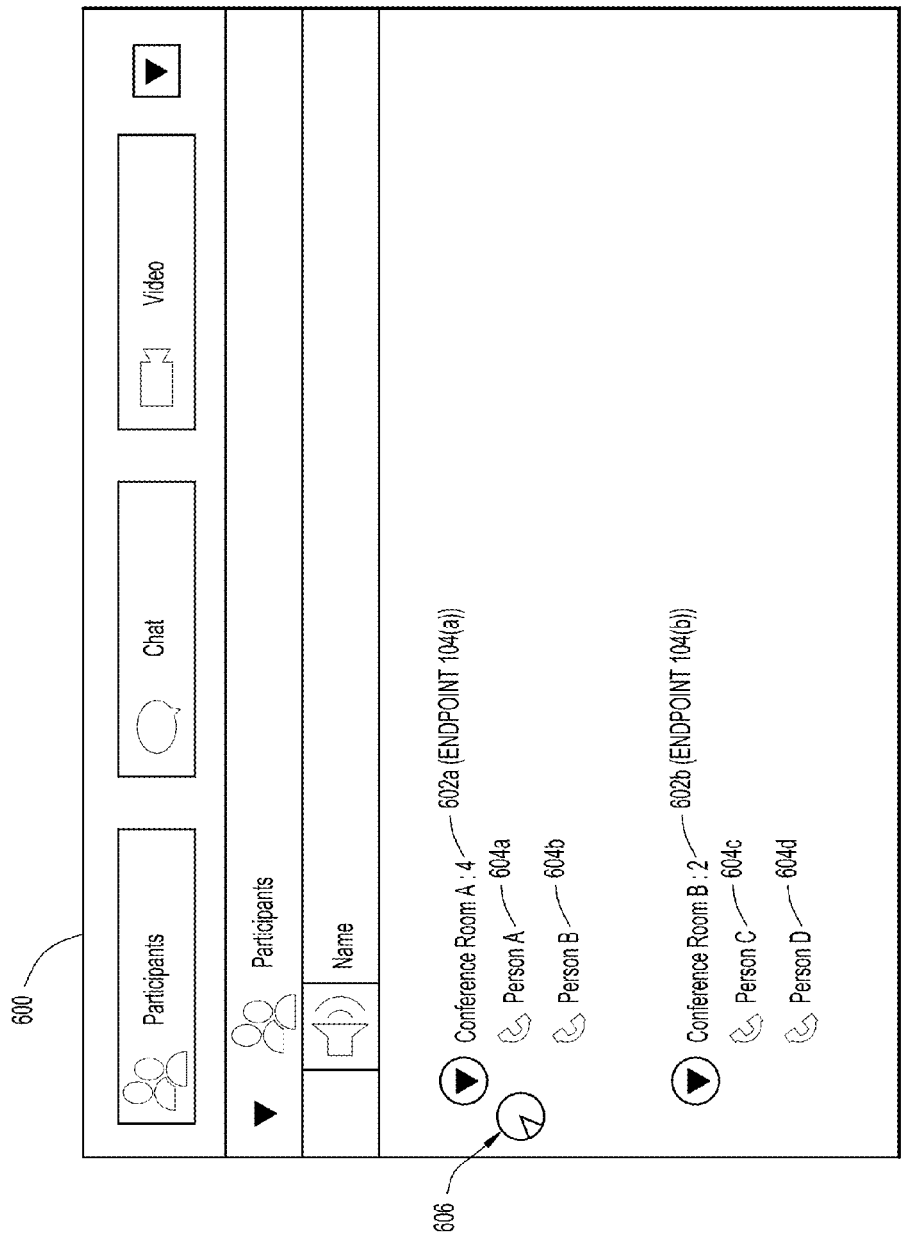
FIG. 6 is an example screenshot of a conference session user interface (UI) that may be generated by an endpoint involved in a conference session, according to an example embodiment.

With reference to FIG. 6 there is an example screenshot of a conference session user interface (UI) 600 (also referred to as a conference information window 600) that may be generated by any of endpoints 104, such as endpoint 104(a), involved in a conference session. UI 600 provides information about the conference session participants proximate various endpoints (i.e., at the same locations as the endpoints) connected to the conference session as identified using the methods described above. Fields 602a and 602b indicate locations of endpoints 104(a) and 104(b), respectively. Fields 604a-d indicate user identities (e.g., usernames) submitted via "participant joined" messages from endpoints 104(a) and 104(b) as participants 106(a)-106(d) joined the conference session through their respective endpoints. The user identities are grouped by the location of the corresponding participant 106. For example, field 602a corresponds to "Conference Room A," which may correspond to a location of room 204 in which endpoint 104(a) is deployed. Fields 604a-b correspond to "Person A" and "Person B" user identities provided via encoded ultrasound from user devices 108(a) and 108(b) proximate to endpoint 104(a), as described above. Similarly, field 602b corresponds to "Conference Room B," which may represent another endpoint, such endpoint 104(b), located in a Conference Room B. Fields 604c-d correspond to "Person C" and "Person D" user identities for participants proximate endpoint 104(b). In the example of FIG. 6, an active speaker indicator 606 indicates that participant 106(a) with user identity "Person A" is currently an active speaker.

Figure 7:
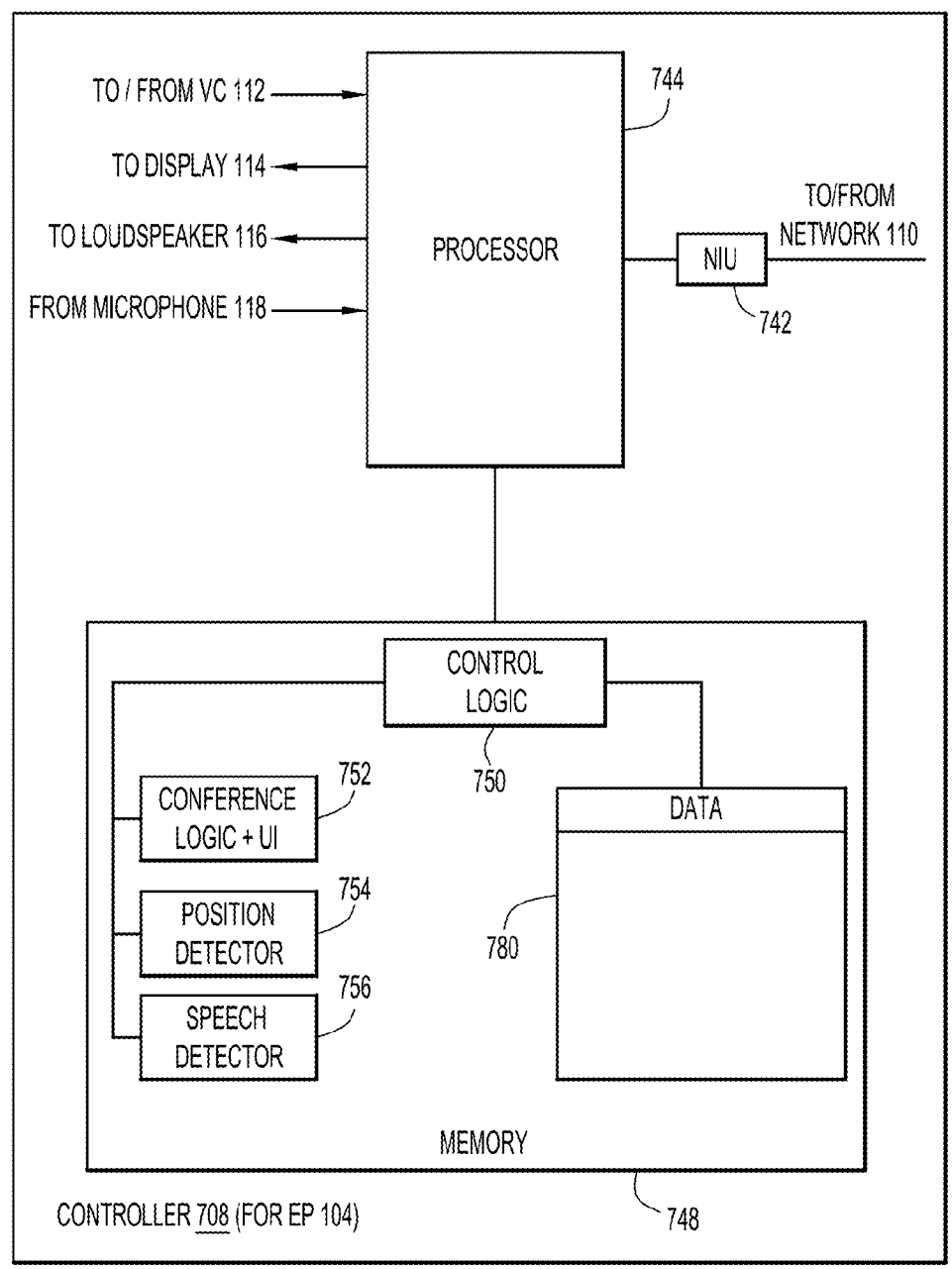
FIG. 7 shows an example block diagram of a controller of an ultrasound-capable endpoint, according to an example embodiment.

Reference is now made to FIG. 7, which shows an example block diagram of a controller 708 of a video conference endpoint 104. Controller 708 performs endpoint operations of method 300 described above. There are numerous possible configurations for controller 708 and FIG. 7 is meant to be an example. Controller 708 includes a network interface unit (NIU) 742, a processor 744, and memory 748. The NIU 742 is, for example, an Ethernet card or other interface device that allows the controller 708 to communicate over communication network 110. NIU 742 may include wired and/or wireless connection capability.

Processor 744 may include a collection of microcontrollers and/or microprocessors, for example, each configured to execute respective software instructions stored in the memory 748. The collection of microcontrollers may include, for example: a video controller to receive, send, and process video signals related to display 114 and video cameras 112; an audio processor to receive, send, and process dual-band (e.g., human-perceptible and ultrasound) audio signals related to loudspeaker 116 and MA 118; and a high-level controller to provide overall control. Processor 744 may send pan, tilt, and zoom commands to video camera 112, which is responsive to the commands as would be appreciated by one of ordinary skill in the relevant arts. Portions of memory 748 (and the instruction therein) may be integrated with processor 744. In the transmit direction, processor 744 encodes human-perceptible audio/video captured/detected by MA 118/VC 112, encodes the captured audio/video into data packets, and causes the encoded data packets to be transmitted to communication network 110. In a receive direction, processor 744 decodes human-perceptible audio/video from data packets received from communication network 110 and causes the audio/video to be presented to local participants 106 via loudspeaker 116/ display 114. As used herein, the terms "audio" and "sound" are synonymous and interchangeably.

The memory 748 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 748 may comprise one or more computer readable storage media (e.g., a memory device) encoded with software comprising computer executable instructions and when the software is executed (by the processor 744) it is operable to perform the operations described herein. For example, the memory 748 stores or is encoded with control logic 750 to perform operations described herein. Control logic 750 includes: Conference Logic 752 to establish conference sessions, communicate over network 110, and implement user interfaces, such as graphical user interfaces, which may be interactive with a user; a Position Detector 754 to determine positions of active talkers based on detected audio that is human-perceptible, determine positions of user devices based on detected ultrasound, and determine whether the determined positions of active talkers coincide with the positions of the user devices; and a Speech Detector 756 to detect whether detected audio includes human speech/voice and provide indications of whether the detected audio includes human speech (or not) to control logic 750.

In addition, memory 748 stores data 780 used and generated by logic 750-756, including, but not limited to: detected sound, determined positions, positional ranges, and identity information for participants.

Figure 8:
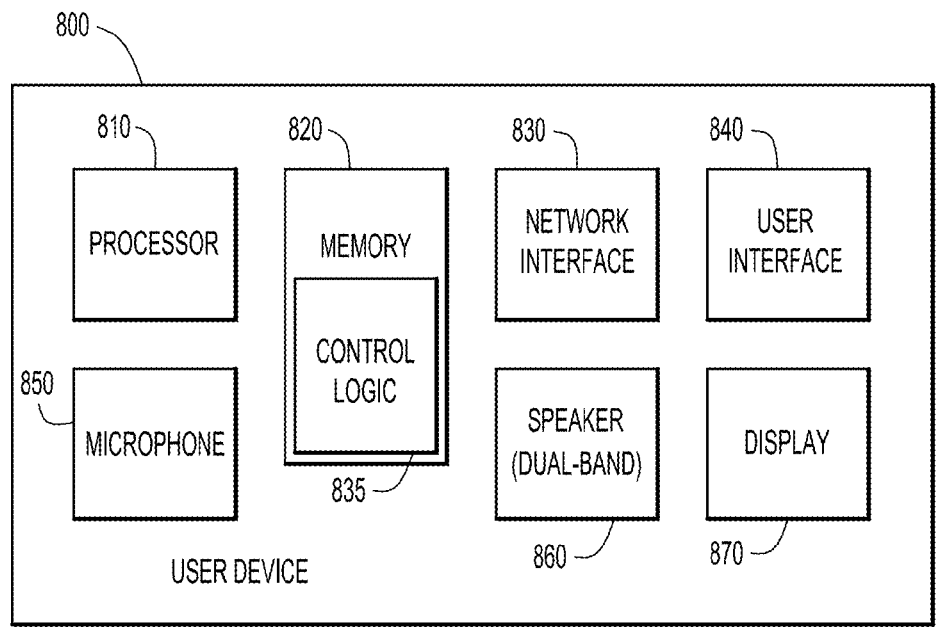
FIG. 8 an example block diagram of an ultrasound-capable user device used to communicate with the ultrasound-capable endpoint during a conference session, according to an example embodiment.

Referring now to FIG. 8, an example block diagram of a user device 800 representative of any of user devices 108(a)-108(d). The use device includes a processor 810 to process instructions relevant to a conference/meeting session supported by the system 100, memory 820 to store a variety of data and software instructions (e.g., display data for shared documents, applications, as well software instructions for a browser application to enable the connectivity and display of data during a meeting, and implement attendee/graphical user interfaces, etc.). The processor 810 is, for example, a microprocessor or microcontroller that executes instructions of attendee/attendee control logic 835 in memory 820 for implementing the processes described herein. Processor 810 may include an audio processor component to process audio in human perceptible and ultrasound bands and an image/video processor component to process images and video. The device also includes a network interface unit (e.g., card) 830 to communicate with other devices over network 110. Device 800 may further include a user interface unit 840 to receive input from a user, a microphone 850 and a dual-band loud speaker 860 capable of transmitting both ultrasound encoded with information and human-perceptible audio. The user interface unit 840 may be in the form of a keyboard, mouse and/or a touchscreen user interface to allow for a user of the attendee device to interface with the device. Microphone 850 and loud speaker 860 enable audio to be recorded and output, respectively, and may comprise an array of a plurality of microphones and/or speakers. Device 130 may also comprise a display 870, including, e.g., a touchscreen display, that can display data to a user, such as content associated with a meeting.

Memory 820 may comprise one or more tangible (non-transitory) computer readable storage media (e.g., a memory device) encoded with software (e.g., control logic/software 835) comprising computer executable instructions and when the software is executed (by the processor 810) it is operable to perform the operations described herein relating to user devices 108(a) and 108(b). Logic 835 includes instructions to generate and display graphical user interfaces to present information on display 870 and allow a participant to provide input to the device depicted in FIG. 8 through, e.g., user selectable options of the graphical user interface, and encode audio with user identity information for transmission in the ultrasound band via loud speaker 860.

Figure 9:
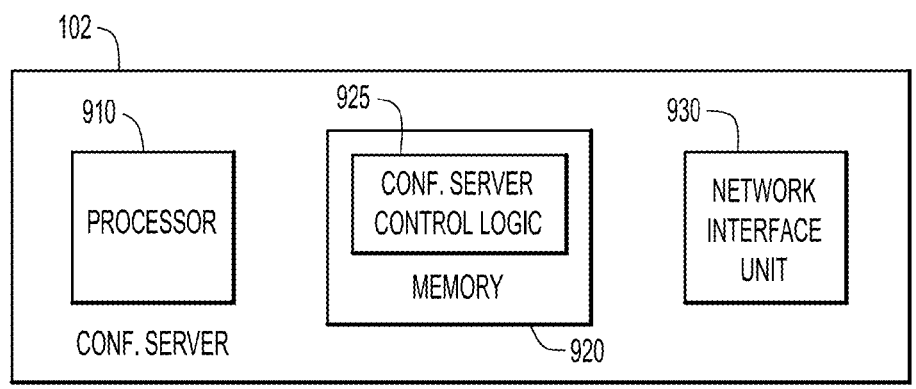
FIG. 9 is a block diagram of a conference server from the video conference system of FIG. 1, according to an example embodiment.

With reference to FIG. 9, there is shown a simplified block diagram of conference server 102. Server 102 includes a processor 910 to process instructions relevant to a conference sessions supported by the system 100, memory 920 to store a variety of data and software instructions (e.g., audio, video, control data, etc.), including meeting server control logic/software 925. The server also includes a network interface unit (e.g., card) 930 that enables network communications so that the server 102 can communicate with other devices, e.g., endpoints 104 and user devices 108, as explained above. Memory 920 may comprise read only memory (ROM), random access memory (RAM), magnetic disk storage media devices, optical storage media devices, flash memory devices, electrical, optical, or other physical/tangible (e.g., non-transitory) memory storage devices. The processor 910 is, for example, a microprocessor or microcontroller that executes instructions for implementing the processes described herein. Thus, in general, the memory 920 may comprise one or more tangible (non-transitory) computer readable storage media (e.g., a memory device) encoded with software (e.g., the meeting server control logic/software 925) comprising computer executable instructions and when the software is executed (by the processor 910) it is operable to perform the operations described herein related to conference server 102. Existing collaboration endpoints are enabled with a microphone array device capable to detecting directional audio.

Figure 10:
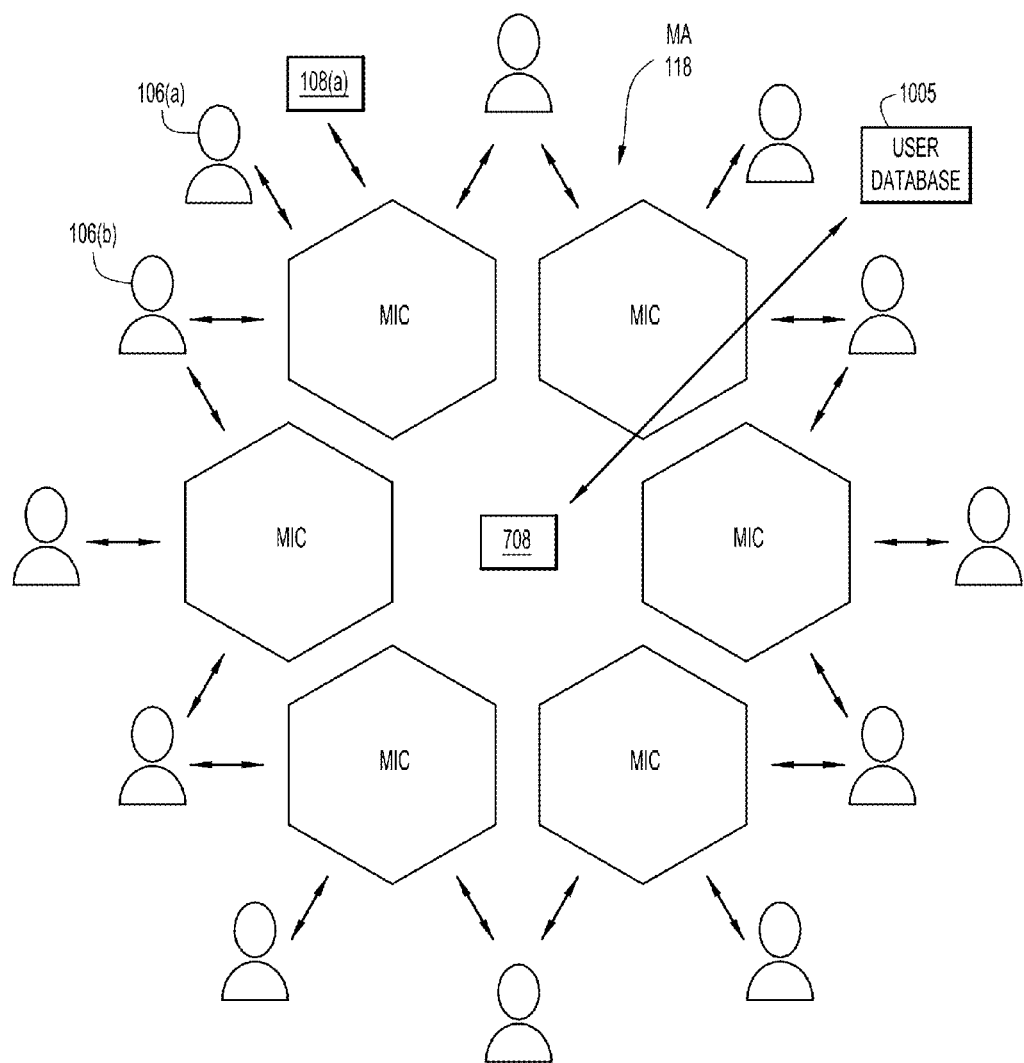
FIG. 10 is an illustration of a 12-channel, dual-band microphone array exchanging audio and ultrasound with participants and a user device, according to an embodiment.

FIG. 10 is an illustration of MA 118 exchanging audio and ultrasound with participants 106 and user device 108(a), according to an embodiment. In the example of FIG. 10, MA 118 is a 12-channel, dual-band microphone array. Each of the 6 pentagons represents a pair of microphones in which one microphone in the pair detects human-perceptible audio and the other detects ultrasound. In addition, controller 708 may access/retrieve further (rich) information about participants 106(a) and 106(b) from participant database 1005 using recovered user identities as an index to the further information in the databases.

In summary, an endpoint includes a dual-band directional microphone array including microphones capable of detecting directional audio in a frequency range perceptible to human hearing and microphones capable of detecting directional ultrasound. A user/participant is associated with a mobile device or laptop (more generally, a "user device") that has an application installed thereon, which stores user identification information, such as the identity of the user associated with the user device. The application "pairs with" the directional ultrasound microphones, i.e., the user device transmits ultrasound encoded with the user identification information to the endpoint, the microphone array detects the ultrasound, and the endpoint recovers the user identification information from the detected ultrasound. As the user device and endpoint are paired based on the ultrasound, audio from an active talker is also detected by the microphone array, and the endpoint determines whether the active taker coincides positionally with the user device based on the detected audio and the detected ultrasound. The active talker is assumed to be associated with the user identification information if is determined that the active talker coincides positionally with the user device. Additionally, speaker identification technology may be used to augment the user identification information with a voiceprint. For example, the user device (e.g., smartphone) may also store an owner's voiceprint and identify an active speaker by transmitting via ultrasound to the endpoint. Overall, the embodiments provide a robust system to identify active speakers in a conference session using ultrasound proximity.

In summary, in one form, a method is provided comprising: at a video conference endpoint device including a microphone array: at the microphone array, detecting ultrasound transmitted by a user device and that is encoded with a user identity; determining a position of the user device relative to the microphone array based on the detected ultrasound and recovering the user identity from the detected ultrasound; at the microphone array, detecting audio in an audio frequency range perceptible to humans from an active talker; determining a position of the active talker relative to the microphone array based on the detected audio; determining whether the position of the active talker and the position of the user device are within a predetermined positional range of each other; and if it is determined that the position of the active talker and the position of the user device are both within the predetermined positional range, assigning the user identity to the active talker.

In another form, an apparatus is provided comprising: a microphone array to detect (i) ultrasound transmitted by a user device and that is encoded with a user identity, and (ii) audio in an audio frequency range perceptible to humans from an active talker; and a processor coupled to the microphone array and configured to: determine a position of the user device relative to the microphone array based on the detected ultrasound and recovering the user identity from the detected ultrasound; determine a position of the active talker relative to the microphone array based on the detected audio; determine whether the position of the active talker and the position of the user device are within a predetermined positional range of each other; and if it is determined that the positions are both within the predetermined positional range, assign the user identity to the active talker.

In yet another form, a processor readable medium is provided to store instructions that, when executed by a processor of a video conference endpoint device including a microphone array configured to detect ultrasound transmitted by a user device and that is encoded with a user identity and detect audio in an audio frequency range perceptible to humans from an active talker, cause the processor to: determine a position of the user device relative to the microphone array based on the detected ultrasound and recovering the user identity from the detected ultrasound; at the microphone array, detect audio in an audio frequency range perceptible to humans from an active talker; determine a position of the active talker relative to the microphone array based on the detected audio; determine whether the position of the active talker and the position of the user device are within a predetermined positional range of each other; and if it is determined that the position of the active talker and the position of the user device are both within the predetermined positional range, assign the user identity to the active talker.

The above description is intended by way of example only. Various modifications and structural changes may be made therein without departing from the scope of the concepts described herein and within the scope and range of equivalents of the claims.

What is claimed is:

1. A method comprising:
at a video conference endpoint device including a microphone array:
detecting at the microphone array ultrasound transmitted by a user device and that is encoded with a user identity;
determining a position of the user device relative to the microphone array based on the detected ultrasound and recovering the user identity from the detected ultrasound;
at the microphone array, detecting audio in an audio frequency range perceptible to humans from an active talker;
determining a position of the active talker relative to the microphone array based on the detected audio;
determining whether the position of the active talker and the position of the user device are within a predetermined positional range of each other; and
if it is determined that the position of the active talker and the position of the user device are both within the predetermined positional range, assigning the user identity to the active talker.

2. The method of claim 1, further comprising:
determining whether the detected audio qualifies as human speech;
if it is determined that the detected audio qualifies as human speech, performing the determining the position of the active talker based on the detected audio that qualifies as human speech; and
if it is determined that the detected audio does not qualify as human speech, not performing the determining the position of the active talker.

3. The method of claim 1, wherein:
the determining the position of the user device based on the detected ultrasound includes determining an angle of arrival of the ultrasound at the microphone array based on the detected ultrasound;
the determining the position of the active talker based on the detected audio includes determining an angle of arrival of the audio at the microphone array based on the detected audio; and
the determining whether the determined positions of the active talker and the user device are within a predetermined positional range of each other includes determining whether the determined angle of arrivals of the ultrasound and the audio are within a predetermined angular range of each other.

4. The method of claim 1, wherein:
the determining the position of the user device based on the detected ultrasound includes determining a distance of the user device from the microphone array based on the detected ultrasound;
the determining the position of the active talker based on the detected audio includes determining a distance of the active talker from the microphone array based on the detected audio; and
the determining whether the determined positions of the active talker and the user device are within a predetermined positional range of each other includes determining whether the determined distances of the user device and the active talker are within a predetermined distance range of each other.

5. The method of claim 1, further comprising:
establishing a video conference session with one or more other video conference endpoint devices over a network;
receiving a participant list that lists participants joined in the video conference session;
after the recovering the user identity from the detected ultrasound, adding the user identity as a participant to the participant list; and
displaying the participant list with the added participant.

6. The method of claim 5, further comprising:
responsive to the assigning the user identity to the active talker, displaying an indication that the added participant is an active talker.

7. The method of claim 5, further comprising:
after the recovering the user identity from the detected ultrasound, transmitting the user identity to the one or more other video conference endpoint devices; and
responsive to the assigning the user identity to the active talker, transmitting to the one or more other video conference endpoint devices an indication that the added participant is an active talker.

8. An apparatus comprising:
a microphone array to detect (i) ultrasound transmitted by a user device and that is encoded with a user identity, and (ii) audio in an audio frequency range perceptible to humans from an active talker; and
a processor coupled to the microphone array and configured to:
determine a position of the user device relative to the microphone array based on the detected ultrasound and recovering the user identity from the detected ultrasound;
determine a position of the active talker relative to the microphone array based on the detected audio;
determine whether the position of the active talker and the position of the user device are within a predetermined positional range of each other; and
if it is determined that the positions are both within the predetermined positional range, assign the user identity to the active talker.

9. The apparatus of claim 8, wherein the processor is further configured to:
determine whether the detected audio qualifies as human speech;
if it is determined that the detected audio qualifies as human speech, perform the determining the position of the active talker based on the detected audio that qualifies as human speech; and
if it is determined that the detected audio does not qualify as human speech, not performing the determining the position of the active talker.

10. The apparatus of claim 8, wherein:
the processor is configured to determine the position of the user device based on the detected ultrasound by determining an angle of arrival of the ultrasound at the microphone array based on the detected ultrasound;
the processor is configured to determine the position of the active talker based on the detected audio by determining an angle of arrival of the audio at the microphone array based on the detected audio; and
the processor is configured to determine whether the determined positions of the active talker and the user device are within a predetermined positional range of each other by determining whether the determined angle of arrivals of the ultrasound and the audio are within a predetermined angular range of each other.

11. The apparatus of claim 8, wherein:
the processor is configured to determine the position of the user device based on the detected ultrasound by determining a distance of the user device from the microphone array based on the detected ultrasound;
the processor is configured to determine the position of the active talker based on the detected audio by determining a distance of the active talker from the microphone array based on the detected audio; and
the processor is configured to determine whether the determined positions of the active talker and the user device are within a predetermined positional range of each other by determining whether the determined distances of the user device and the active talker are within a predetermined distance range of each other.

12. The apparatus of claim 8, further comprising a display coupled to the processor, wherein the processor is further configured to:
establish a video conference session with one or more other video conference endpoint devices over a network;
receive a participant list that lists participants joined in the video conference session;
after the recovering the user identity from the detected ultrasound, add the user identity as a participant to the participant list; and
display the participant list with the added participant.

13. The apparatus of claim 12, wherein the processor is further configured to:
responsive to the assigning the user identity to the active talker, display an indication that the added participant is an active talker.

14. A non-transitory computer readable storage media encoded with instructions that, when executed by a processor of a video conference endpoint device including a microphone array configured to detect ultrasound transmitted by a user device and that is encoded with a user identity and detect audio in an audio frequency range perceptible to humans from an active talker, cause the processor to:
determine a position of the user device relative to the microphone array based on the detected ultrasound and recovering the user identity from the detected ultrasound;
at the microphone array, detect audio in an audio frequency range perceptible to humans from an active talker;
determine a position of the active talker relative to the microphone array based on the detected audio;
determine whether the position of the active talker and the position of the user device are within a predetermined positional range of each other; and
if it is determined that the position of the active talker and the position of the user device are both within the predetermined positional range, assign the user identity to the active talker.

15. The computer readable storage media of claim 14, further comprising instructions to cause the processor to:
determine whether the detected audio qualifies as human speech;
if it is determined that the detected audio qualifies as human speech, perform the determining the position of the active talker based on the detected audio that qualifies as human speech; and
if it is determined that the detected audio does not qualify as human speech, not perform the determining the position of the active talker.

16. The computer readable storage media of claim 14, wherein:
the instructions to determine the position of the user device based on the detected ultrasound include instructions to cause the processor to determine an angle of arrival of the ultrasound at the microphone array based on the detected ultrasound;
the instructions to determine the position of the active talker based on the detected audio include instructions to determine an angle of arrival of the audio at the microphone array based on the detected audio; and
the instructions to determine whether the determined positions of the active talker and the user device are within a predetermined positional range of each other include instructions to determine whether the determined angle of arrivals of the ultrasound and the audio are within a predetermined angular range of each other.

17. The computer readable storage media of claim 14, wherein:
the instructions to determine the position of the user device based on the detected ultrasound include instructions to determine a distance of the user device from the microphone array based on the detected ultrasound;
the instructions to determine the position of the active talker based on the detected audio include instructions to determine a distance of the active talker from the microphone array based on the detected audio; and
the instructions to determine whether the determined positions of the active talker and the user device are within a predetermined positional range of each other include instructions to determine whether the determined distances of the user device and the active talker are within a predetermined distance range of each other.

18. The computer readable storage media of claim 14, further comprising instructions to cause the processor to:
establish a video conference session with one or more other video conference endpoint devices over a network;
receive a participant list that lists participants joined in the video conference session;
after the recovering the user identity from the detected ultrasound, add the user identity as a participant to the participant list; and
generate for display the participant list with the added participant.

19. The computer readable storage media of claim 18, further comprising:
responsive to the assigning the user identity to the active talker, generate for display an indication that the added participant is an active talker.

20. The computer readable storage media of claim 18, further comprising instructions to cause the processor to:
after the recovering the user identity from the detected ultrasound, transmit the user identity to the one or more other video conference endpoint devices; and
responsive to the assigning the user identity to the active talker, transmit to the one or more other video conference endpoint devices an indication that the added participant is an active talker.

* * * * *